Nov. 30, 1937.  C. E. WELLMAN  2,100,462
HYDRAULIC WHEEL CYLINDER BRAKE
Filed March 20, 1937
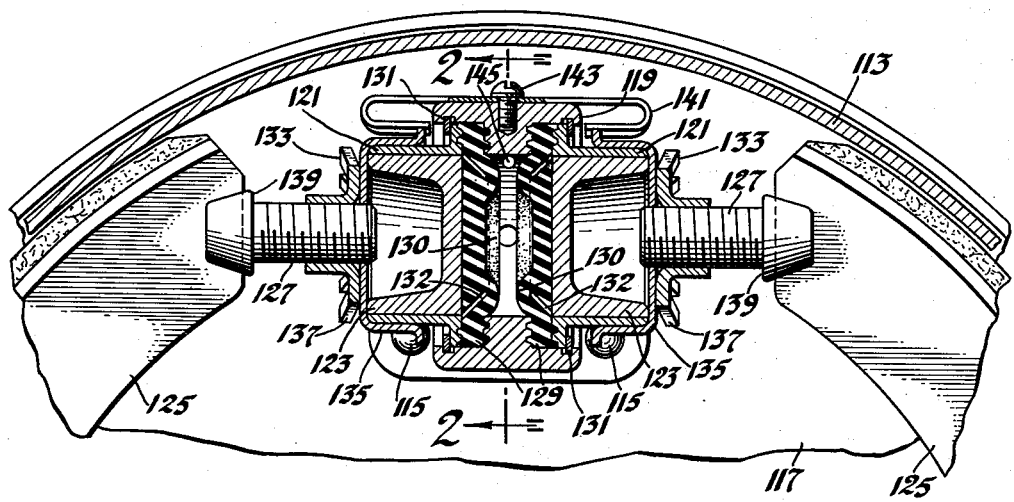
Fig. 1
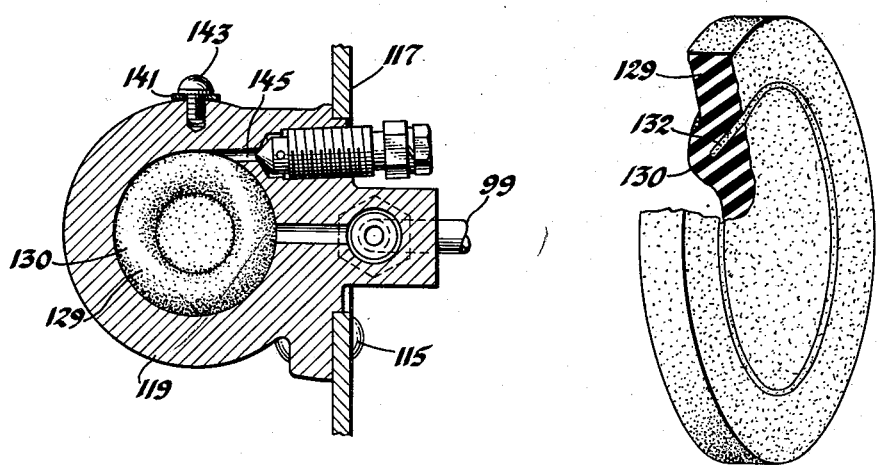
Fig. 2
Fig. 3
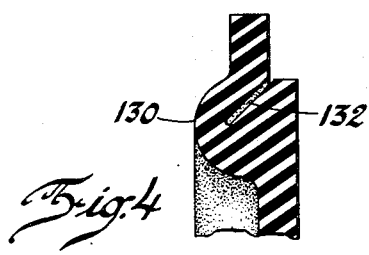
Fig. 4
Inventor
Charles E. Wellman
By Blackmore, Spencer & Flint
Attorneys Patented Nov. 30, 1937

2,100,462

UNITED STATES PATENT OFFICE 2,100,462

HYDRAULIC WHEEL CYLINDER BRAKE

Charles E. Wellman, Dayton, Ohio, assignor to General Motors Corporation, Detroit, Mich., a corporation of Delaware Application March 20, 1937, Serial No. 131,978

6 Claims. (Cl. 60—54.6)

This invention relates to brakes. Specifically, the invention involves an improvement in the sealing means between the piston and the cylinder of the brake shoe actuator of a hydraulic brake system for vehicles.

An object of the novel sealing means is to effectively prevent the escape of the hydraulic medium from the system and to prevent the admission of air thereto.

A second object is to prevent the rubber seal from being damaged by being squeezed between the cylinder and the piston.

Another object is to seal the sliding piston by rubber discs which shall be distorted under a force of compression but not stretched.

Among other objects are long life for the sealing means and low cost of production.

Still other objects and advantages will be understood from the following description.

In the drawing:

Figure 1 is a longitudinal section through a part of the brake drum showing the novel hydraulic actuator.

Figure 2 is a section on line 2—2 of Figure 1.

Figure 3 is a perspective of the novel rubber seal.

Figure 4 is a sectional view of a portion of a modified form of seal.

Referring by numerals to the drawing, the conventional brake drum is marked 113. At 117 is the fixed cover plate. Numeral 115 is used to show the fastening means by which a central annulus 119 is secured to cover 117. Cylindrical extensions 121 are associated with the annulus 119 and together constitute the wheel cylinder. Within this cylinder are slidable pistons 123 for moving the brake shoes 125 into frictional contact with the drum through the instrumentality of rods 127. Adjusting nuts 133 are threaded to rods 127. These nuts are secured to cups 135 slidable along the ends of the cylinder and engageable with the ends of extensions 121 to limit the releasing movement of the shoes. Since there is a non-rotatable connection between the shoes and the rods 127, rotation of nuts 133 serves to reciprocate the rods and adjust the shoe clearance. To maintain the position of adjustment yielding means 141 is secured by a screw 143 to the annulus 119. The ends of the member 141 engage notches in the edge of the cups 135.

Between the central annulus and the radial flanges of the extensions 121 are clamped the peripheral margins of rubber discs 129. By means of lugs on the metallic parts and a retaining ring 131, the rubber discs are securely anchored as shown. Fluid under pressure from a conventional conduit 99 is admitted to the space between the rubber discs. Provision for bleeding air from the system is shown at 145.

On the inner side of each rubber ring, the side exposed to the hydraulic fluid pressure is an annular bulge 130. From a point on the outer side of the rubber ring adjacent the region of contact of the piston and cylinder, an annular groove 132 is cut into or formed in the face of the rubber. The groove extends at an angle to the axis of the cylinder and toward the thick part of the bulge as shown in Figures 1 and 2.

In sealing devices of this kind heretofore known, the fluid medium pressing on the rubber disc and moving the piston has been subject to stretching and the rubber is apt to be squeezed between the piston and cylinder. In the present improvement, the surface entrance to the slot 132 permits the central part of the rubber disc to advance the piston with little or no stretching of the rubber between the piston and cylinder. Moreover, under the influence of the fluid pressure the rubber is distorted by compression into the groove which will be collapsed. As a result of this construction very desirable results are obtained. The rubber disc has long life, is not damaged by being stretched when the pressure is applied and is not in danger of being squeezed between the piston and cylinder.

Figure 4 shows a slight modification. In this figure, the same bulge 130 and slot 132 are used. The circular region bounded by the surface opening of the slot is of greater thickness axially so that the rubber engaging the face of the piston is of appreciable thickness throughout, this thick region extending to the region where the piston meets the cylinder wall. In other respects this modification resembles the form already described.

I claim:

1. In a cylinder, a piston, a deformable disc, peripherally secured to said cylinder, said disc having a face engaging said piston, means to admit fluid under pressure against the opposite face of the disc, said disc having an annular groove entering its piston engaging face.

2. The invention defined by claim 1, said disc having an annular bulge on its face subject to fluid pressure, said groove extending into said bulge.

3. In a cylinder, a piston, a deformable disc peripherally clamped to said cylinder, said disc having a face engaging said piston its opposite face being subject to fluid pressure, said disc having an annular groove in its piston engaging face and opening adjacent the region of contact between piston and cylinder.

4. The invention defined by claim 3, said disc having an annular bulge on its other face, the bulge having its region of maximum depth radially within the cylinder wall, said slot extending angularly into said bulge.

5. In combination, a cylinder having a central annulus and axial extensions, rubber discs peripherally clamped between said central annulus and said extensions, pistons engaged by the remote faces of said discs, means to admit hydraulic medium between said discs, each disc having an annular groove entering its piston engaging face.

6. The invention defined by claim 5, said discs having annular bulged regions on their adjacent faces, the thick part of the bulged regions being within the cylinder wall, said grooves being extended from a region adjacent the cylinder wall toward the thick part of said bulged regions.

CHARLES E. WELLMAN.